US008965157B2

(12) United States Patent
Sakakibara et al.

(10) Patent No.: US 8,965,157 B2
(45) Date of Patent: Feb. 24, 2015

(54) SEMICONDUCTOR POINTED STRUCTURE AND METHOD FOR FABRICATING SAME, SPOT SIZE CONVERTER, AND NON-REFLECTIVE TERMINATOR

(71) Applicant: National Institute of Advanced Industrial Science and Technology, Tokyo (JP)

(72) Inventors: Youichi Sakakibara, Ibaraki (JP); Ryohei Takei, Ibaraki (JP); Masahiko Mori, Ibaraki (JP); Toshihiro Kamei, Ibaraki (JP)

(73) Assignee: National Institute of Advanced Industrial Science and Technology (JP)

( * ) Notice: Subject to any disclaimer, the term of this patent is extended or adjusted under 35 U.S.C. 154(b) by 108 days.

(21) Appl. No.: 13/800,770

(22) Filed: Mar. 13, 2013

(65) Prior Publication Data
US 2014/0199018 A1    Jul. 17, 2014

(30) Foreign Application Priority Data

Jan. 17, 2013 (JP) ................................. 2013-006445

(51) Int. Cl.
| G02B 6/26 | (2006.01) |
| G02B 6/136 | (2006.01) |
| G02B 6/122 | (2006.01) |
| G02B 6/30 | (2006.01) |
| G02B 6/24 | (2006.01) |

(52) U.S. Cl.
CPC ............ *G02B 6/136* (2013.01); *G02B 6/1228* (2013.01); *G02B 6/305* (2013.01); *G02B 6/241* (2013.01)
USPC ........................................................... 385/43

(58) Field of Classification Search
None
See application file for complete search history.

(56) References Cited

U.S. PATENT DOCUMENTS

| 5,574,742 A * | 11/1996 | Ben-Michael et al. .... 372/45.01 |
| 6,037,189 A * | 3/2000 | Goto ............................... 438/31 |
| 8,285,092 B2 | 10/2012 | Deki et al. ...................... 385/28 |
| 2002/0131471 A1* | 9/2002 | Sugiyama ...................... 372/108 |
| 2003/0142909 A1* | 7/2003 | Suzuki et al. ................... 385/33 |
| 2003/0176075 A1* | 9/2003 | Khan et al. ..................... 438/714 |
| 2009/0324164 A1* | 12/2009 | Reshotko et al. ............... 385/14 |
| 2011/0170825 A1* | 7/2011 | Spector et al. .................. 385/43 |
| 2012/0224820 A1 | 9/2012 | Onishi .......................... 385/131 |

FOREIGN PATENT DOCUMENTS

| JP | 2000-235128 A * | 8/2000 | |
| JP | 2002122750 | 4/2002 | ............ G02B 6/122 |

(Continued)

OTHER PUBLICATIONS

Yamada et al., "Silicon Wire Waveguiding System—Fundamental Characteristics and Applications," IEICE Transactions on Electronics (Japanese Edition), 2005, vol. J88-C, No. 6, pp. 374-387 (15 pgs) (English translation of abstract only).

(Continued)

*Primary Examiner* — Mike Stahl
(74) *Attorney, Agent, or Firm* — Hayes Soloway P.C.

(57) ABSTRACT

A semiconductor pointed structure formed at an end portion of the core structure of a semiconductor photonic wire waveguide has a sloped side wall on at least one of the sides that constitute the pointed structure. The semiconductor pointed structure decreases in width and thickness towards the distal end. A method for fabrication of the structure is also disclosed.

14 Claims, 11 Drawing Sheets

(56) References Cited

FOREIGN PATENT DOCUMENTS

| | | | |
|---|---|---|---|
| JP | 2004133446 | 4/2004 | ............. G02B 6/122 |
| JP | 2004-184986 A * | 7/2004 | |
| JP | 2006-098697 | 4/2006 | ............. G02B 6/122 |
| JP | 2008-149530 | 7/2008 | ............... B41J 2/135 |
| JP | 2011180166 | 9/2011 | ............... G02B 6/13 |
| JP | 2012-181433 | 9/2012 | ............. G02B 6/122 |
| WO | WO 94/15231 A1 * | 7/1994 | |
| WO | WO 2004/008203 | 1/2004 | ............. G02B 6/122 |
| WO | WO 2008/114624 | 9/2008 | ............. G02B 6/122 |

OTHER PUBLICATIONS

Takei, et al., "Ultranarrow Silicon Inverse Taper Waveguide Fabricated with Double-Patterning Photolithography for Low-Loss Spot-Size Converter," Applied Physics Express 5 (2012) 052202 (4 pgs).
Japanese Official Action from corresponding Japanese Serial No. 2013-006445, with English translation dated Sep. 17, 2014 (6 pages).

* cited by examiner

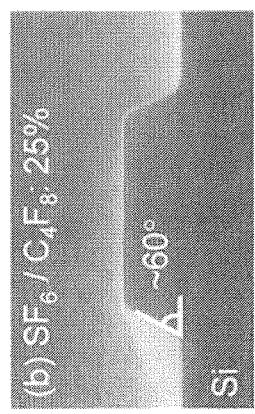
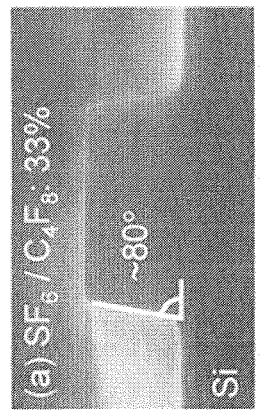
Fig. 3

US 8,965,157 B2

SEMICONDUCTOR POINTED STRUCTURE AND METHOD FOR FABRICATING SAME, SPOT SIZE CONVERTER, AND NON-REFLECTIVE TERMINATOR

TECHNICAL FIELD

The present invention relates to a semiconductor pointed structure and a method for fabricating same, a spot size converter, and a non-reflective terminator.

BACKGROUND ART

Optical integrated circuits constituted from silicon photonic wire waveguides make possible improvements in integration density and lower costs, and therefore show promise as a next-generation technology. A silicon photonic wire waveguide has a silicon core of sub-micron size, and a cladding which typically comprises silicon dioxide. Due to the high refractive index differential between the core and the cladding, guided waves are strongly confined within the core. Therefore, sufficiently low bending losses can be achieved even at small bending radii on the order of several microns, making possible very high density integration of optical device.

Fabrication techniques for silicon optical integrated circuits are compatible with silicon LSI fabrication techniques which are highly suited to mass production. Consequently, employing such LSI fabrication techniques is promising in terms of lowering the cost of silicon optical integrated circuits.

A problem encountered with sub-micron scale silicon photonic wire waveguides is that, due to the very great mismatch in mode dimension between the optical fiber and external optical elements such as the semiconductor laser or the like, optical wave coupling is extremely inefficient.

One method of solving this problem is to employ a spot size converter (SSC) having a silicon pointed structure (also called a "taper") as shown in FIG. 7. In a silicon pointed structure SSC, between the silicon photonic wire waveguide and a second waveguide—the shape of the optical mode of which is to be efficiently matched with an external optical element—there is disposed a section in which the structure of the silicon optical waveguide has a silicon pointed structure of progressively smaller line width and covered by the core of the second waveguide, whereby the mode shape of the light confined within the silicon photonic wire waveguide is progressively expanded within the covering core of the second waveguide. Through this function, highly efficient optical wave coupling to external optical elements can be achieved. (See Patent Documents 1, 2 and Non-patent Document 1)

A prerequisite for obtaining highly efficient optical mode conversion in an SSC having a silicon pointed structure is that the optical mode be sufficiently expanded in shape outside of the silicon core. A very fine pointed structure is necessary for this purpose.

It has been indicated that, in a case in which the height of the silicon core is 220 nm, there is a need for a width of 100 nm or less for the TE mode; for the TM mode, a width of 50 nm or less at the distal end would be desirable. However, particularly with ordinary silicon LSI processes employing photolithography, fabrication of such an extremely fine pointed structure is extremely difficult due to the limits of resolution in the photolithography used in the process.

For this reason, methods employing electron beam exposure techniques have been proposed (see Patent Document 2, Non-patent Document 1)

However, due to their very low production throughput, electron beam exposure techniques are not promising as production techniques for practical purposes.

Moreover, while in principle {good results} would be achievable by employing the leading-edge immersion ArF excimer stepper technique, a problem is that the immersion ArF excimer stepper technique requires extremely high process costs.

With the foregoing in view, the inventors proposed a double patterning method for achieving a pointed structure of a silicon photonic wire waveguide, by a process comparable to one that relies upon an electron beam exposure technique or immersion ArF excimer stepper technique, even where a low-resolution exposure device such as an i-line stepper or the like is employed. (see Patent Document 3, Non-Patent Document 2)

Through the double patterning method, a silicon pointed structure having a distal end width of 50 nm can be formed, even when an i-line stepper with a resolution limit of about 200 nm is employed.

This double patterning method is described below, citing fabrication examples 1 to 3.

FABRICATION EXAMPLE 1

As shown in FIG. 8(a), a silicon photonic wire waveguide core structure 1 lacking a pointed structure is formed by formation of a photoresist pattern through i-line stepper exposure, followed by dry etching.

Next, as shown in FIG. 8(b), a photoresist 3 is applied over the silicon photonic wire waveguide core structure formed in this manner. Next, shown in FIG. 8(c), employing a mask pattern which includes as a portion thereof a side that will become one of the sides constituting the pointed structure, i-line stepper exposure and development are performed in such a way as to remove the photoresist from an area to the outside of this side.

Next, the core structure that has been exposed through the opening created by removal of the photoresist is removed through dry etching, and then the residual resist is removed, thereby forming a core structure as shown in FIG. 8(d).

Next, a photoresist is applied as shown in FIG. 8(e).

Next, as shown in FIG. 8(f), employing a mask pattern which includes as a portion thereof a side 2 that will become another side constituting the pointed structure, i-line stepper exposure and development are performed in such a way as to remove the photoresist from an area to the outside of this side.

Next, the core structure that has been exposed through the opening 4 created by removal of the photoresist is removed through dry etching, and then the residual resist is removed, forming a silicon pointed structure 7 having a side 5 and another side 6 as shown in FIG. 8(g). The desired silicon pointed structure in which the width at the distal end is 100 nm or less, overcoming the diffraction barrier, can be achieved thereby.

FABRICATION EXAMPLE 2

As shown in FIG. 9(a), a silicon photonic wire waveguide core structure 1 having in a part thereof a side 2 that will become a side constituting the silicon pointed structure is formed by formation of a photoresist pattern through i-line stepper exposure, followed by dry etching.

Next, a photoresist 3 is applied onto the silicon photonic wire waveguide core structure formed thereby, as shown in FIG. 9(b).

Next, as shown in FIG. 9(c), employing a mask pattern which includes as a portion thereof a side that will become another side constituting the silicon pointed structure, i-line stepper exposure and development are performed in such a way as to remove the photoresist from an area to the outside of this side.

Next, the core structure that has been exposed through the opening 4 created by removal of the photoresist is removed through dry etching, and then the residual resist is removed, forming a pointed structure 7 having a side 5 and another side 6 as shown in FIG. 9(d). The desired silicon pointed structure in which the width at the distal end is 100 nm or less, overcoming the diffraction barrier, can be achieved thereby.

FABRICATION EXAMPLE 3

As shown in FIG. 10(a), a silicon photonic wire waveguide core structure 1 in which one of the sides that will constitute the pointed structure is included as portion 2 lying on an extension of the silicon photonic wire waveguide is formed by formation of a photoresist pattern through i-line stepper exposure, followed by dry etching.

Next, a photoresist 3 is applied onto the silicon photonic wire waveguide core structure formed thereby, as shown in FIG. 10(b).

Next, as shown in FIG. 10(c), employing a mask pattern which includes as a portion thereof a side that will become another side constituting the silicon pointed structure, i-line stepper exposure and development are performed in such a way as to remove the photoresist from an area to the outside of this side.

Next, the core structure that has been exposed through the opening 4 created by removal of the photoresist is removed through dry etching, and then the residual resist is removed, forming a silicon pointed structure 7 having a side 5 and another side 6 as shown in FIG. 10(d). The desired pointed structure in which the width at the distal end is 100 nm or less, overcoming the diffraction barrier, can be achieved thereby.

However, a problem still remains in the fabrication methods shown in the aforedescribed fabrication examples 1 to 3.

The problem is that of the pointed structure in proximity to the distal end becoming broken, as shown in FIG. 11.

Specifically, as shown in FIG. 7, the cross section of the pointed structure in proximity to the distal end has a very high aspect ratio. Therefore, the distal end of the pointed structure is extremely brittle, and readily collapses when passing through the washing or drying step subsequent to formation. This collapse gives rise to a problem in relation to performance of the SSC. Because the collapsed distal end scatters propagated light, excessive loss may arise.

Additionally, for the same given line width, in TM-like mode, the degree of retention of light intensity in the silicon photonic wire waveguide is greater than in TE-like mode, and therefore a distal end collapse produces a greater loss in TM-like mode, giving rise as a result to polarized wave-dependent characteristics of mode conversion losses.

To summarize the above, a silicon photonic wire waveguide having such a pointed structure, while desirable due to its high efficiency, is still inadequate in the following respects, in terms of achieving low loss and reducing the polarized wave-dependent characteristics.

(1) Due to collapse arising at the distal end of the pointed structure, excessive scattering loss arises.

(2) Because mode expansion is not sufficient, particularly in TM mode, the losses exhibit polarized wave-dependent characteristics.

CITATION LIST

Patent Literature

{Patent Document 1} Japanese Laid-Open Patent Application 2002-122750
{Patent Document 2} Japanese Laid-Open Patent Application 2004-133446
{Patent Document 3} Japanese Laid-Open Patent Application 2011-180166

Non Patent Literature

{Non-patent Document 1} Koji YAMADA, et al., "Silicon Wire Waveguiding System—Fundamental Characteristics and Applications—", Denshi Joho Tsushin Gakkai Ronbunshi C, Vol. J88-C, pp. 374-387 (2005)
{Non-patent Document 2} Appl. Phys. Express. 5, (2012) 052202

SUMMARY OF INVENTION

Technical Problem

An object of the present invention is to solve the problems cited in (1) and (2) above, and provide a semiconductor pointed structure that achieves low loss and reduced polarized wave-dependent characteristics, and a fabrication method therefor, as well as a spot size converter and a non-reflective terminator.

Solution to Problem

Means for solving the aforementioned problems are as follows.

(1) A semiconductor pointed structure formed at an end portion of a core structure of a semiconductor photonic wire waveguide, and having a sloped side wall on at least one of the sides constituting a pointed structure, the semiconductor pointed structure characterized in the width and thickness decreasing towards a distal end.

(2) The semiconductor pointed structure according to the aforementioned (1), characterized in a cross section of the semiconductor photonic wire waveguide core structure being rectangular or trapezoidal.

(3) The semiconductor pointed structure according to the aforementioned (1) or (2), characterized in a side and another side constituting the pointed structure having sloped side walls.

(4) The semiconductor pointed structure according to any of the aforementioned (1) to (3), characterized in the shape of the cross section in proximity to the distal end being triangular.

(5) The semiconductor pointed structure according to any of the aforementioned (1) to (4), characterized in the semiconductor being silicon.

(6) A method for fabricating a semiconductor pointed structure, including: a step for forming a core structure for a semiconductor photonic wire waveguide including a side constituting a pointed structure; a step for applying a photoresist to the core structure of the semiconductor photonic wire waveguide; a step for employing a mask pattern which includes as a portion thereof another side constituting the silicon pointed structure, and forming an opening in the photoresist so as to remove an area of the photoresist, to the outside of the other side constituting the silicon pointed structure; and a step for dry etching such that the side wall of the other side constituting the pointed structure positioned below the opening slopes in the thickness direction.

(7) The method for fabricating a semiconductor pointed structure according to the aforementioned (6), characterized in a cross section of the semiconductor photonic wire waveguide core structure being rectangular or trapezoidal.

(8) The method for fabricating a semiconductor pointed structure according to the aforementioned (6) or (7), characterized in that, in the step for forming a semiconductor silicon photonic wire waveguide core structure including a side constituting said pointed structure, the side wall of the side constituting said pointed structure is dry etched so as to slope in the thickness direction.

(9) The method for fabricating a semiconductor pointed structure according to any of the aforementioned (6) to (8), characterized in the semiconductor being silicon.

(10) The method for fabricating a semiconductor pointed structure according to the aforementioned (9), characterized in the dry etching being performed in a mixed gas atmosphere of a gas for undercutting silicon and a gas able to deposit a protective film on side walls.

(11) The method for fabricating a semiconductor pointed structure according to the aforementioned (10), characterized in the gas for undercutting silicon being $SF_6$, and the gas able to deposit a protective film on side walls being $C_4F_8$.

(12) A semiconductor photonic wire waveguide spot size converter equipped with the semiconductor pointed structure according to any of the aforementioned (1) to (5), a second core thereabove, and a further top clad layer thereabove.

(13) The semiconductor photonic wire waveguide spot size converter according to the aforementioned (12), characterized in that the semiconductor being silicon, the second core comprising benzocyclobutene and the top clad layer comprising an epoxy resin.

(14) A non-reflective terminator equipped with the semiconductor pointed structure according to any of the aforementioned (1) to (5).

Advantageous Effects of Invention

According to the present invention, there is obtained a pointed structure of silicon or other semiconductor, affording low loss and reduced polarized wave-dependent characteristics. In addition, lower costs are achieved in optical integrated circuits having a pointed structure of silicon or other semiconductor.

BRIEF DESCRIPTION OF DRAWINGS

FIG. 3 is an SEM image describing the basic principle of etching according to the invention;

DESCRIPTION OF EMBODIMENTS

{Semiconductor Pointed Structure According to the Invention}

Figure 1:
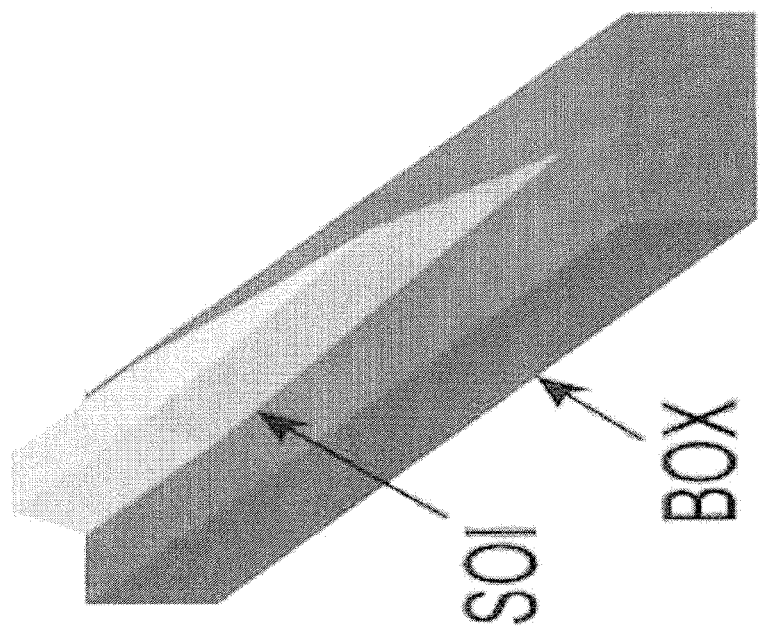
FIG. 1 is a schematic diagram showing a pointed structure of silicon or other semiconductor according to the invention.

FIG. 1 is a schematic diagram showing a pointed structure of silicon or other semiconductor according to the invention.

Figure 2:
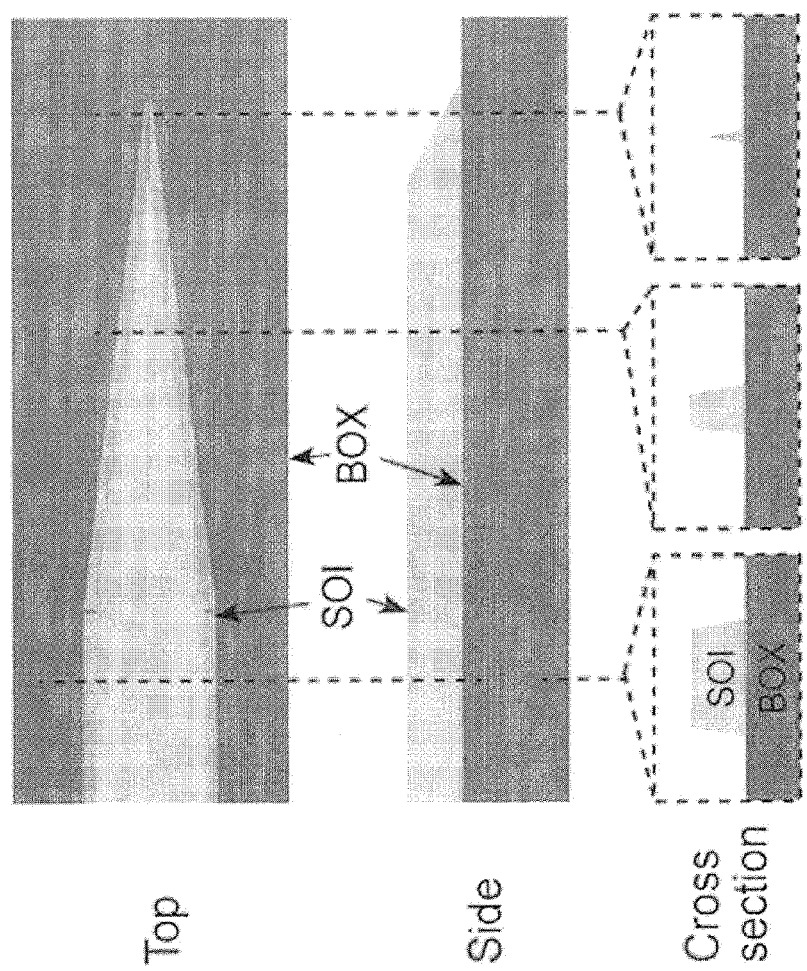
FIG. 2 is a schematic diagram showing a top view, a side view, and a cross section of regions of a pointed structure of silicon or other semiconductor according to the invention.

FIG. 2 is a schematic diagram showing a top view, a side view, and a cross section of regions of a pointed structure of silicon or other semiconductor according to the invention.

As may be understood from FIG. 2, the shape of the cross section at the basal part (waveguide portion) of the semiconductor pointed structure is trapezoidal, while in proximity to the distal end, the shape of the cross section is triangular. The semiconductor pointed structure becomes progressively smaller in thickness and width towards the distal end.

In the case of a structure such as this, the aspect ratio does not rise towards the distal end, and therefore collapse at the distal end can be prevented.

Furthermore, a structural feature whereby the semiconductor pointed structure becomes smaller in height (thickness), besides having advantages in terms of structural dynamics, has advantages in terms of the physical optics of the light modes.

Specifically, by reducing the thickness, in TM-like mode in proximity to the distal end, effusion of light intensity from within the silicon optical waveguide to within the second waveguide is more effective, and as a result, mode conversion losses can be efficiently reduced for the TM-like mode. Therefore, the polarized wave-dependent characteristics of mode conversion losses can be reduced.

In FIGS. 1 and 2, SOI is the abbreviation for "Silicon On Insulator," and BOX is the abbreviation for "Buried OXide."

The following detailed description of fabrication of a semiconductor pointed structure takes the example of fabrication of a silicon pointed structure; however, the invention is not limited thereto, and basically can be applied in fabrication of semiconductor pointed structures employing other semiconductor materials such as GaAs, InP, or the like.

{Basic Principle of Etching According to the Invention}

In the present invention, a side wall angle control technique is adopted in the steps of the double patterning process for forming the silicon pointed structure.

Specifically, in the dry etching process for forming the sides that constitute the silicon pointed structure, inductively coupled reactive ion etching is performed in a mixed gas atmosphere of a gas for undercutting silicon, for example $SF_6$, and a gas able to deposit a protective film on the side walls, for example $C_4F_8$, the mixture ratio R ($=SF_6/C_4F_8$) being adjusted to control the slope angle of the side wall of each side.

As may be understood from the SEM images in FIGS. 3(a) and (b), in a case in which, for example, R=33%, the side wall slope angle is approximately 80 degrees, whereas in the case of a smaller value of R=25%, the side wall slope angle is approximately 60 degrees.

The optimal side wall slope angle for the purposes of fabricating the silicon pointed structure according to the invention is obtained through appropriate selection of the mixture ratio R.

Provided that the side wall angle control technique applied in the invention is a dry etching method whereby a sloping structure in which the bottom part extends out in comparison with the top part of the side wall, any method may be employed. Besides the aforedescribed method, it would be acceptable to employ a method, for example, in which the width of the photoresist is cut down during dry etching, reducing the width of the top part of the article being etched.

{Method of Fabricating Silicon Pointed Structure According to the Invention}

Figure 8:
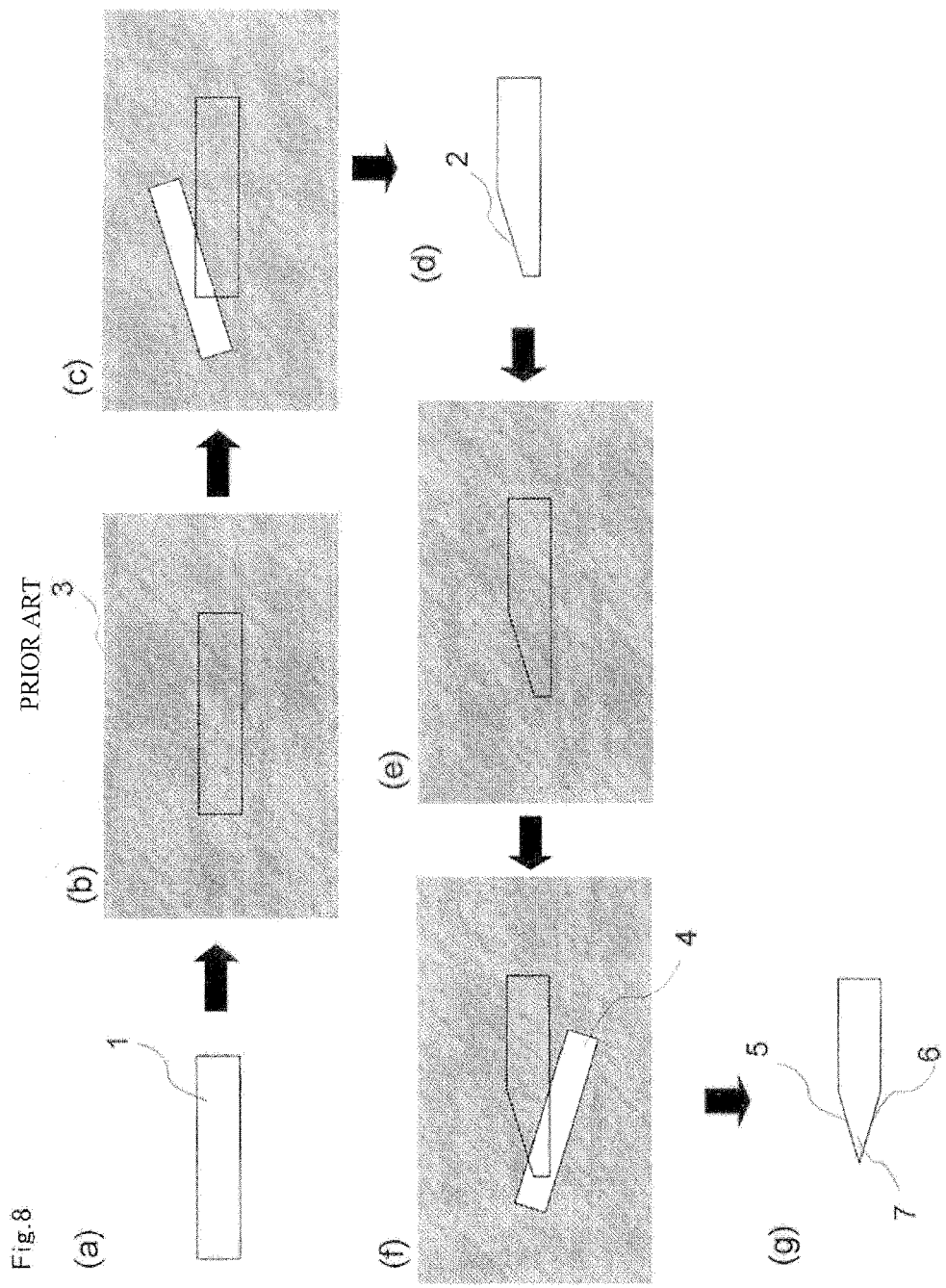
FIG. 8 is a schematic diagram showing fabrication example 1 of a prior art silicon pointed structure.
Figure 9:
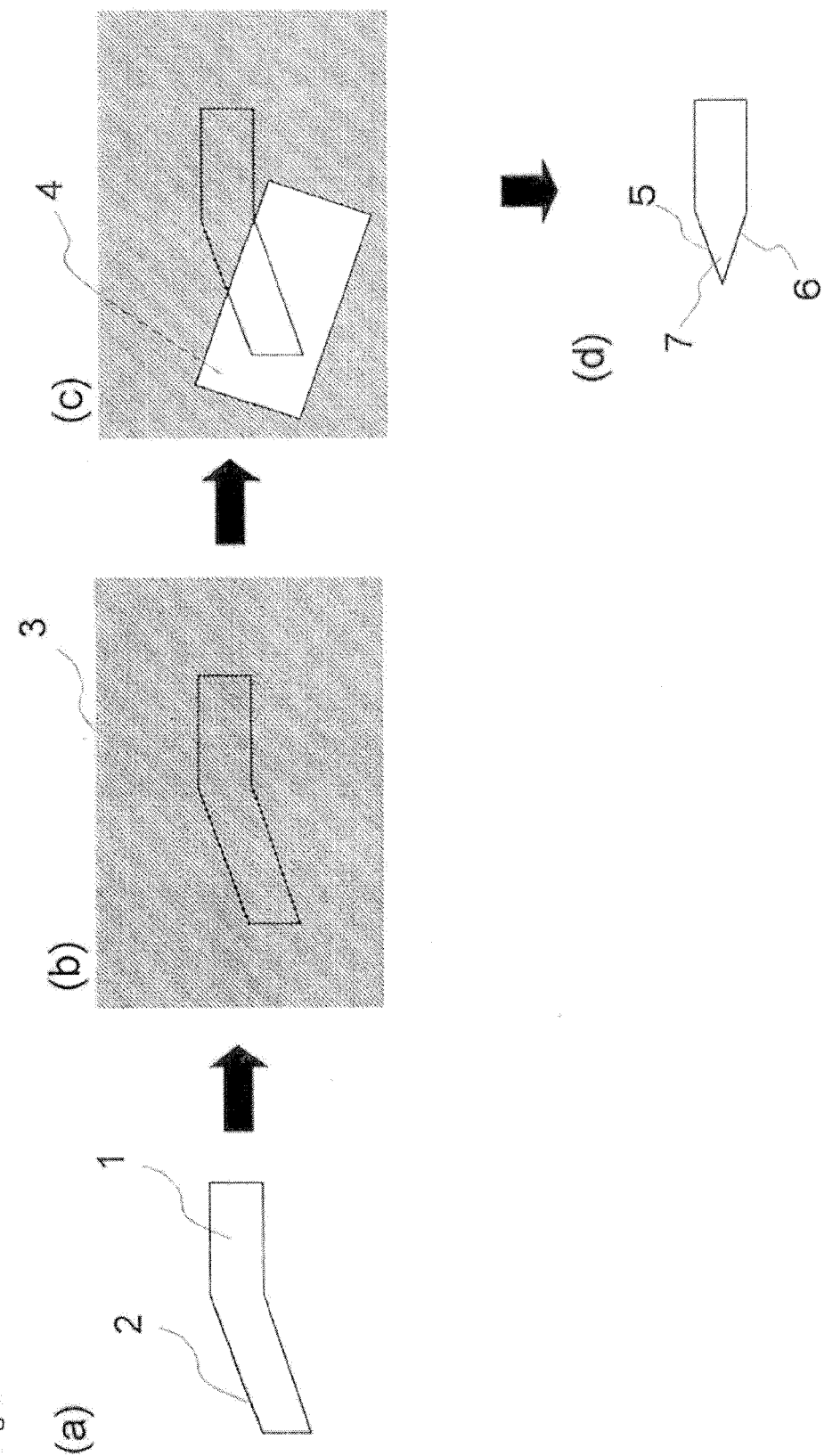
FIG. 9 is a schematic diagram showing fabrication example 2 of a prior art silicon pointed structure.
Figure 10:
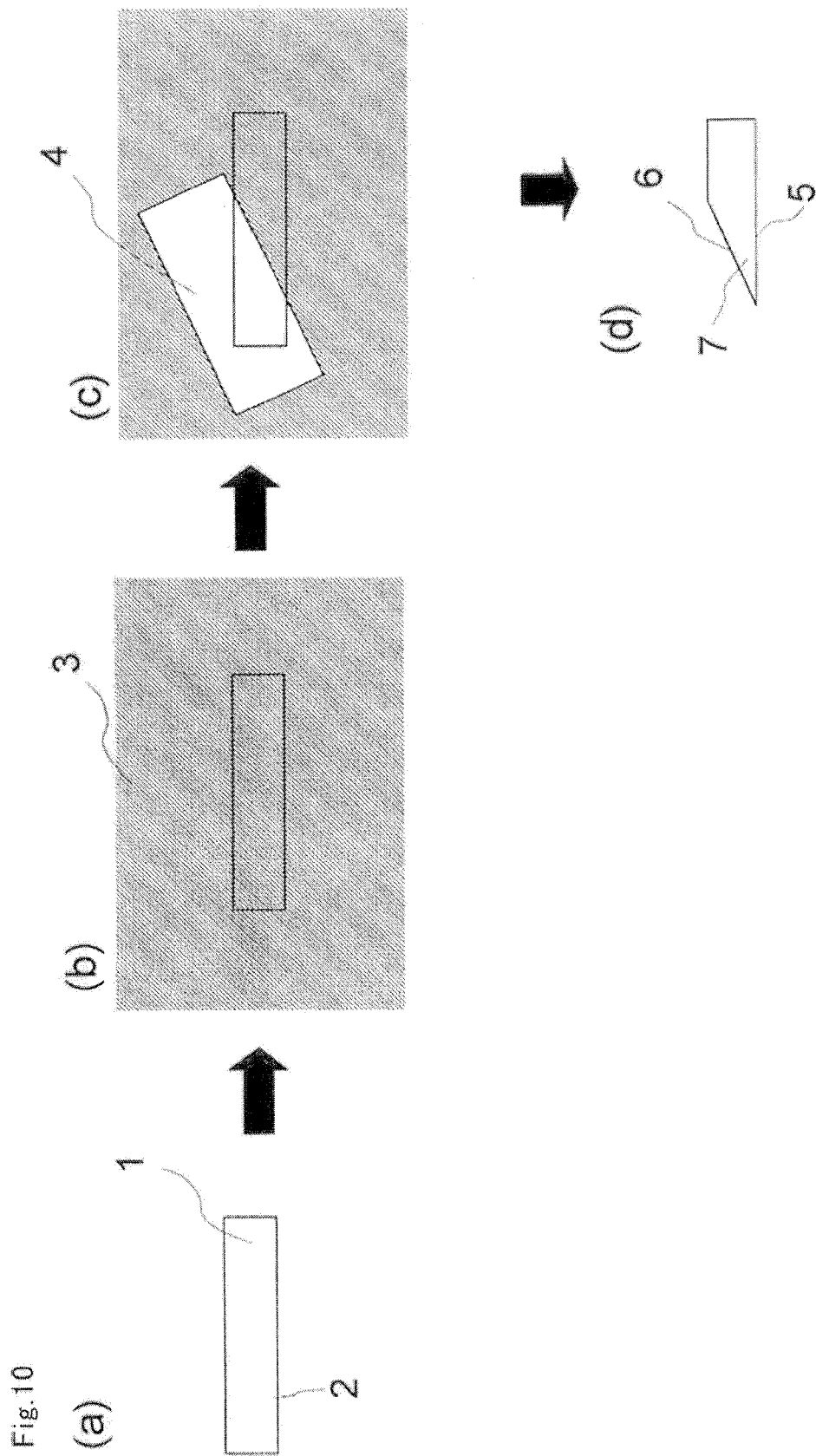
FIG. 10 is a schematic diagram showing fabrication example 3 of a prior art silicon pointed structure.
Figure 11:
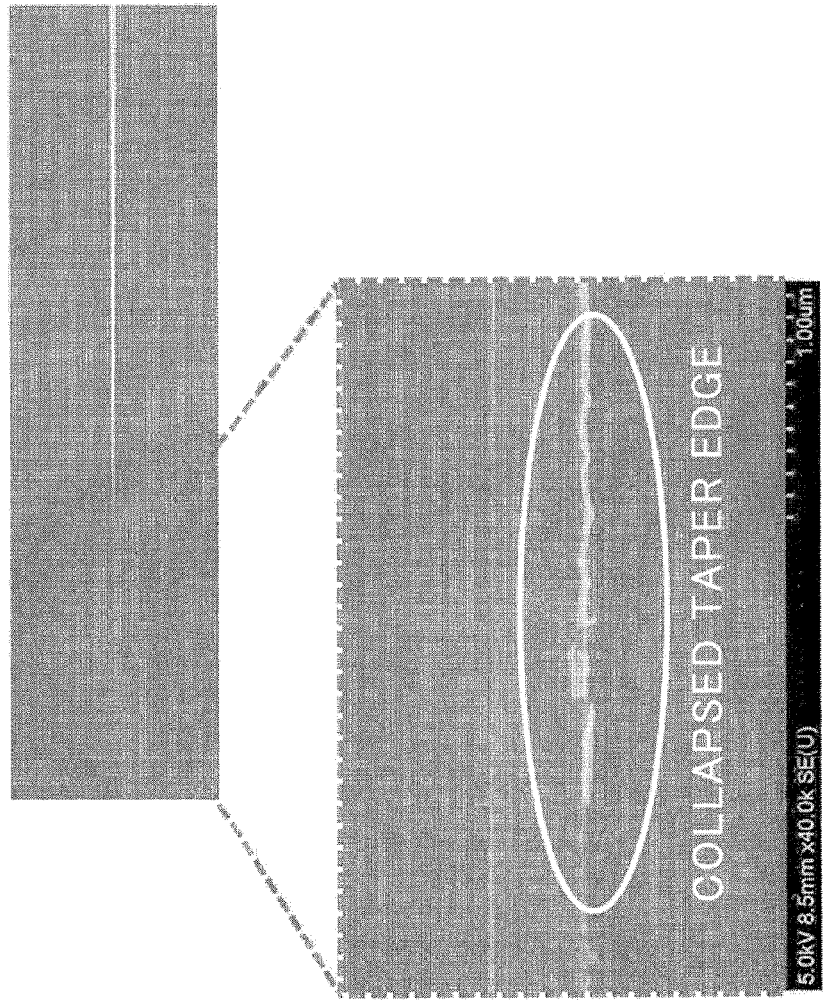
FIG. 11 is an SEM image showing an example of collapse in a prior art silicon pointed structure.

The method of fabricating the silicon pointed structure according to the invention is basically no different from the steps in the double patterning method described in the prior art fabrication examples 1 to 3 in FIGS. 8 to 10.

A feature of the present invention is that, when carrying out the steps in the prior art double patterning method in FIGS. 8(c) and (f), FIGS. 9(a) and (c), and FIGS. 10(a) and (c), an etching technology is applied to adjust the slope angle of the side walls of the sides that constitute the silicon pointed structure, such as discussed in the preceding section on the basic principle of etching according to the invention.

In the waveguide portion which, as shown by the left hand broken line section in FIG. 2 showing the silicon pointed structure, is adequately expansive in width, the boundaries of the photoresist of the second exposure pattern lie in a planar portion of the top surface of the sides formed in the first {etching step}, and therefore subsequent to double patterning, the shape of the cross section is trapezoidal, with no reduction in height.

Next, in the center broken line section in FIG. 2, a reduction in width is observed, but there is no reduction in height.

As shown by the right hand broken line section in FIG. 2, in the distal end portion, the boundaries of the photoresist of the second exposure pattern overlap the tops of the sloped side walls of the sides formed in the first {etching step}, and therefore the shape of the cross section is triangular. It will be appreciated that as the shape of the cross section becomes triangular, the height of the triangle becomes lower in association with narrower width. The inventors call this distal end portion shape a "knife edge taper."

By combining patterns of larger size than the resolution limit of photolithography, pointed structures of size smaller than the resolution limit can be formed.

{Experimental Example of Silicon Pointed Structure According to the Invention}

Employing the aforedescribed etching technique, a silicon pointed structure was fabricated experimentally on an SOI substrate having silicon 220 nm in thickness, and a BOX layer 3 μm in thickness. For the patterning step, an i-line stepper having a resolution limit of about 200 nm was used.

The silicon was etched under a condition of R=33%, so that side walls of about 80 degrees could be formed.

Figure 4:
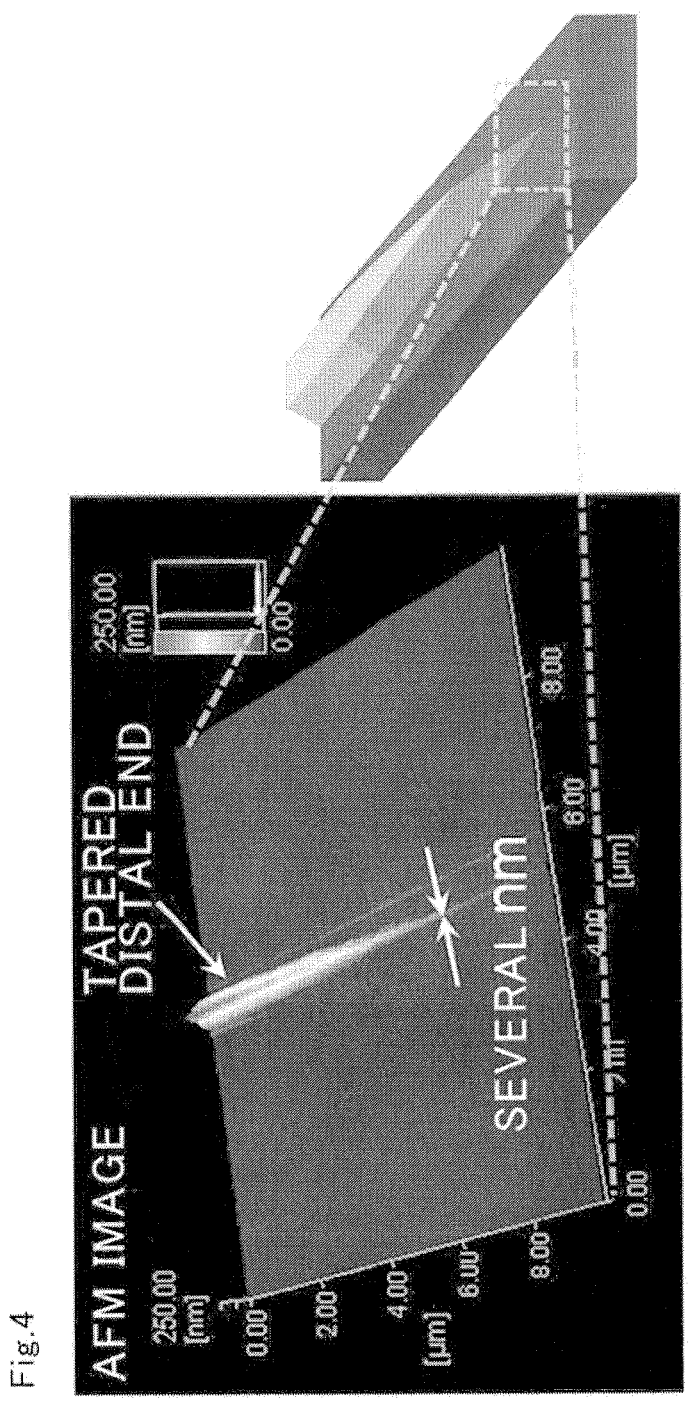
FIG. 4 is an AFM image of the silicon pointed structure according to the invention.

FIG. 4 shows an atomic force microscope (AFM) image of the distal end of the silicon pointed structure that was fabricated. It will be appreciated that the height (thickness) becomes progressively smaller towards the distal end. It was verified thereby that a silicon pointed structure can be formed through a combination of the double patterning method and sloped etching of side walls.

In preferred practice, the slope angle of the side walls is 60 degrees to 85 degrees inclusive, more preferably 75 degrees to 80 degrees inclusive.

{Example of Spot Size Converter Equipped with Silicon Pointed Structure According to the Invention}

A spot size converter (SSC) having a silicon pointed structure was fabricated.

A polymer second core 2 μm square aligned in position was formed over a silicon pointed structure about 180 μm in length, by a machining process comprising spin coating, i-beam exposure, and $CF_4$ based dry etching.

Benzocyclobutene (BCE) having a refractive index of 1.535 at a 1.55 μm wavelength was employed as the material for the second core.

In order to protect the silicon photonic wire waveguide from bombardment by the $CF_4$ plasma during BCB etching, the spin-coated BCB layer was left over the entire silicon photonic wire waveguide. This means that the silicon photonic wire waveguide section has a BCB top clad layer 2 μm thick. An epoxy resin layer having a refractive index of 1.446 at a 1.55 μm wavelength was coated on as the top clad layer of the BCB second core.

{Evaluation of SSC Equipped with Silicon Pointed Structure According to the Invention}

The mode conversion losses per SSC unit equipped with silicon pointed structure according to the invention were investigated experimentally at a 1.55 μm wavelength. In this experiment, the SSC unit comprised a mode conversion region including a knife edge taper 180 μm in length, BCE second waveguides 30 μm in length connected respectively to the front and back thereof, and a silicon photonic wire waveguide 10 μm in length.

In order to accurately measure values of mode conversion loss, a device layout comparable to that in the case of an SSC unit equipped with the prior art silicon pointed structure was employed.

Propagation losses of the prototyped BCB waveguides and silicon photonic wire waveguide were respectively about 3 dB/cm and 8 dB/cm, and losses in the waveguides in the SSC unit could be ignored due to the extremely short waveguide length. Therefore, insertion loss of the SSC unit approximates the mode conversion loss.

Figure 5:
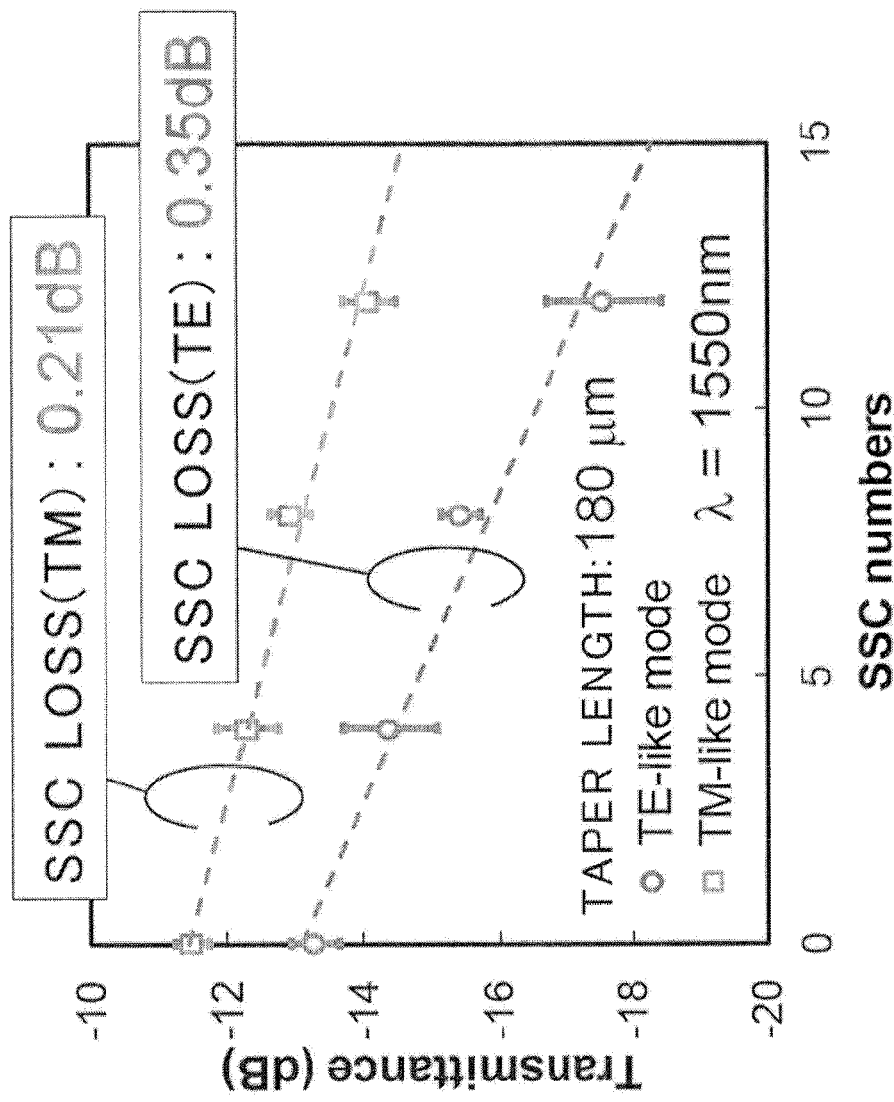
FIG. 5 is the transmittance of an SSC equipped with the silicon pointed structure according to the invention.
Figure 6:
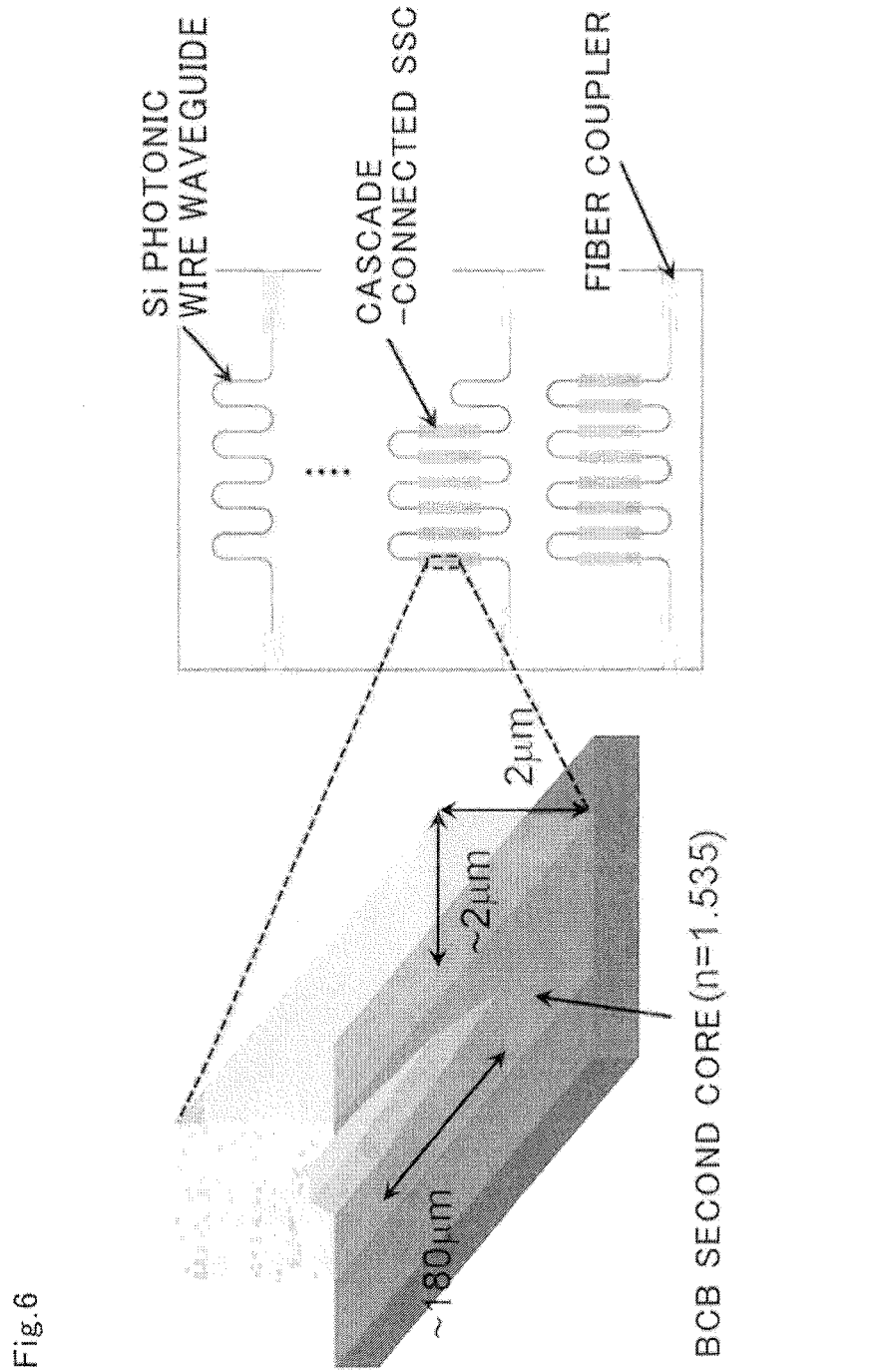
FIG. 6 is a drawing describing a connection method for a plurality of SSC equipped with the silicon pointed structure according to the invention.
Figure 7:
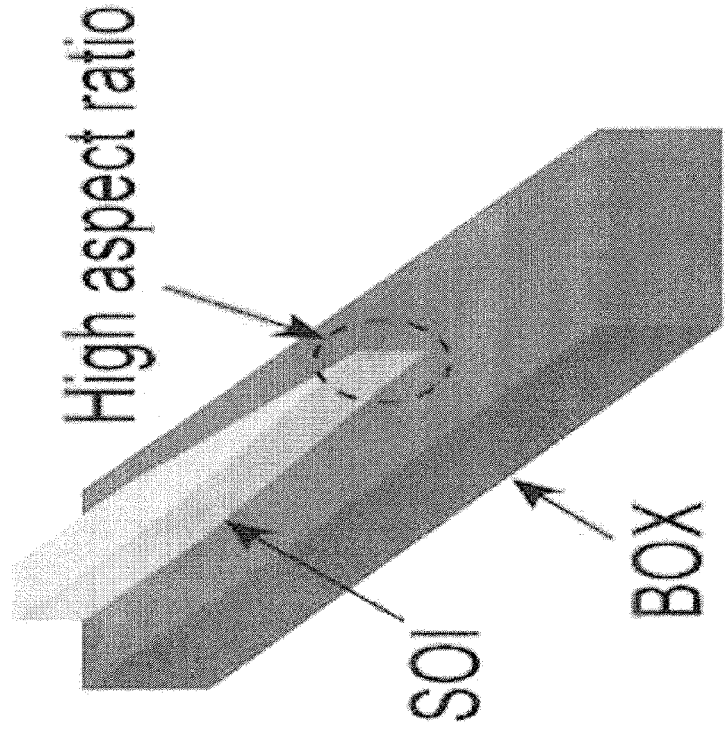
FIG. 7 is a schematic diagram showing a prior art silicon pointed structure.

FIG. 5 shows the transmissivity of silicon photonic wire waveguides in which different numbers of cascade-connected SSCs were inserted in silicon photonic wire waveguides, as shown in FIG. 6.

In FIG. 5, measurement results for a TE-like mode and a TM-like mode are shown. The broken lines are fitted line plots of the measurement results, and correspond to mode transmission losses per SSC unit.

From these results, it was clear that mode transmission losses are 0.35 dB for TE-like mode and 0.21 dB for TM-like mode. Introduction of the silicon pointed structure according to the present invention afforded ample improvement as compared with losses with the prior art device (0.55 dB for TE-like mode and 0.98 dB for TM-like mode), with the improvement being particularly notable for the TM-like mode.

According to the present invention, it has become clear that high-performance silicon pointed structures implementable in SSCs having ultra-low loss and low polarized wave-dependent characteristics can be formed while employing mature, low-cost, non-cutting-edge photolithography techniques. I-beam exposure methods using exposure of photoresists are widely employed in back end steps (BEOL) for forming LSI metal wiring. Consequently, where a side wall slope etching step is introduced into a BEOL process, the technology will potentially have high compatibility with the BEOL process.

Silicon photonic techniques involving BEOL processes show promise in making it possible to directly build optical interconnection networks on the basis of hydrogenated amorphous silicon having high transmittance and growable at low temperature, stacked over an LSI metal wiring layer.

The silicon material used in the silicon pointed structure of the invention is not limited to crystalline silicon, and amorphous silicon is acceptable as well. In the case of amorphous silicon, hydrogenated amorphous silicon is preferred for the purpose of low absorption loss by the material, but materials to which elements other than silicon, such as carbon, germanium, or the like, are added are acceptable as well.

While a spot size converter equipped with a pointed structure of a semiconductor such as silicon according to the present invention has been shown by way of example, the invention is not limited thereto, and may be applied in a non-reflective terminator of a pointed structure of a semiconductor such as silicon.

While up to this point the present invention has been described taking the example in which the materials used in the pointed structure and the photonic wire waveguide are silicon materials, the invention is not limited thereto, and as noted previously, can be applied in pointed structures and photonic wire waveguides employing semiconductor materials such as GaAs, InP, and the like as well.

REFERENCE SIGNS LIST

1 Silicon photonic wire waveguide core structure
2 Side constituting silicon pointed structure
3 Photoresist
4 Opening in photoresist
5 Side constituting silicon pointed structure
6 Other side constituting silicon pointed structure
7 Silicon pointed structure

The invention claimed is:

1. A silicon pointed structure formed at an end portion of a core structure of a silicon photonic wire waveguide, and having a sloped side wall on at least one of the sides constituting a pointed structure, wherein the silicon pointed structure has a width and thickness decreasing towards a distal end thereof, and wherein the shape of the cross section in proximity to the distal end is triangular.

2. The silicon pointed structure according to claim 1, wherein a cross section of said silicon photonic wire waveguide core structure is rectangular or trapezoidal.

3. The silicon pointed structure according to claim 1, wherein a side and another side constituting the pointed structure have sloped side walls.

4. A method for fabricating a semiconductor pointed structure, including: a step for forming a core structure for a semiconductor photonic wire waveguide including a side constituting a pointed structure; a step for applying a photoresist to the core structure of said semiconductor photonic wire waveguide; a step for employing a mask pattern which includes as a portion thereof another side constituting the pointed structure, and forming an opening in said photoresist so as to remove an area of the photoresist to the outside of the other side constituting the pointed structure; and a step for dry etching such that the side wall of the other side constituting the pointed structure positioned below said opening slopes in the thickness direction.

5. The method for fabricating a semiconductor pointed structure according to claim 4, wherein said semiconductor photonic wire waveguide core structure is trapezoidal.

6. The method for fabricating a semiconductor pointed structure according to claim 4, wherein in the step for forming a semiconductor silicon photonic wire waveguide core structure including a side constituting said pointed structure, the side wall of the side constituting said pointed structure is dry etched so as to slope in the thickness direction.

7. The method for fabricating a semiconductor pointed structure according to claim 4, wherein said semiconductor comprises silicon.

8. The method for fabricating a semiconductor pointed structure according to claim 7, wherein said dry etching is performed in a mixed gas atmosphere of a gas for undercutting silicon and a gas able to deposit a protective film on side walls.

9. The method for fabricating a semiconductor pointed structure according to claim 8, wherein the gas for undercutting said silicon comprises $SF_6$, and the gas able to deposit a protective film on side walls comprises $C_4F_8$.

10. A silicon photonic wire waveguide spot size converter equipped with a silicon pointed structure formed at an end portion of a core structure of a silicon photonic wire waveguide, and having a sloped side wall on at least one of the sides constituting a pointed structure, wherein the silicon pointed structure has a width and thickness decreasing towards a distal end thereof, a second core thereabove, and a further top clad layer thereabove.

11. The silicon photonic wire waveguide spot size converter according to claim 10, wherein said semiconductor comprises silicon, said second core comprises Benzocyclobutene and said top clad layer comprises an epoxy resin.

12. A non-reflective terminator equipped with the silicon pointed structure according claim 1.

13. A silicon photonic wire waveguide spot size converter equipped with the silicon pointed structure according to claim 2, a second core thereabove, and a further top clad layer thereabove.

14. A silicon photonic wire waveguide spot size converter equipped with the silicon pointed structure according to claim 3, a second core thereabove, and a further top clad layer thereabove.

* * * * *

UNITED STATES PATENT AND TRADEMARK OFFICE
CERTIFICATE OF CORRECTION

PATENT NO. : 8,965,157 B2
APPLICATION NO. : 13/800770
DATED : February 24, 2015
INVENTOR(S) : Sakakibara et al.

Page 1 of 1

It is certified that error appears in the above-identified patent and that said Letters Patent is hereby corrected as shown below:

In the Claims

Claim 2, Col. 9, line 39, "is rectangular or trapezoidal" should be --is trapezoidal--.

Claim 6, Col. 10, line 11, "semiconductor silicon photonic" should be --semiconductor photonic--.

Signed and Sealed this
Twenty-first Day of July, 2015

Michelle K. Lee
*Director of the United States Patent and Trademark Office*